US006320678B1

United States Patent
Kim (10) Patent No.: US 6,320,678 B1
(45) Date of Patent: *Nov. 20, 2001

(54) TECHNIQUE FOR COPYING A PLURALITY OF PAGES ON AN IMAGE FORMING APPARATUS

(75) Inventor: Ho-Gi Kim, Kyungki-do (KR)

(73) Assignee: Samsung Electronics Co., Ltd., Suwon (KR)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/933,336

(22) Filed: Sep. 18, 1997

Related U.S. Application Data (63) Continuation-in-part of application No. 08/679,439, filed on Jul. 12, 1996, now abandoned.

(30) Foreign Application Priority Data

Jul. 12, 1995 (KR) .................................................. 95-20505

(51) Int. Cl.$^7$ ....................................................... H04N 1/40
(52) U.S. Cl. ........................................... 358/448; 358/401
(58) Field of Search .................................... 358/448, 468, 358/400, 403, 401; 399/81, 361, 381, 383

(56) References Cited

U.S. PATENT DOCUMENTS

| | | | |
|---|---|---|---|
| 5,060,080 | * 10/1991 | Hwang | 358/401 |
| 5,084,770 | 1/1992 | Nakayma | 358/403 |
| 5,095,373 | 3/1992 | Hisano | 358/402 |
| 5,124,748 | 6/1992 | Tanabe et al. | 355/200 |
| 5,129,016 | 7/1992 | Murakami et al. | 382/61 |
| 5,185,821 | 2/1993 | Yoda | 382/61 |
| 5,227,816 | * 7/1993 | Forest | 399/361 |
| 5,291,305 | 3/1994 | Sakahsita et al. | 358/444 |
| 5,369,505 | 11/1994 | Watanabe et al. | 358/444 |
| 5,384,830 | 1/1995 | Ide | 379/67 |
| 5,392,131 | 2/1995 | Umeno | 358/403 |
| 5,499,109 | 3/1996 | Mathur et al. | 358/400 |
| 5,517,316 | * 5/1996 | Hube | 358/296 |

* cited by examiner

Primary Examiner—Thomas D. Lee
Assistant Examiner—Stephen Brinich
(74) Attorney, Agent, or Firm—Robert E. Bushnell, Esq.

(57) ABSTRACT

A technique for copying a plurality of pages requiring different numbers of copies by displaying a message asking a user to designate the desired number of copies for each page upon feeding a plurality of pages; storing the desired number of copies inputted by the user in response to the message for each page; and scanning and storing the fed pages, and sequentially copying the pages to provide a number of copies equal to the desired number of copies.

12 Claims, 6 Drawing Sheets

TECHNIQUE FOR COPYING A PLURALITY OF PAGES ON AN IMAGE FORMING APPARATUS

CROSS REFERENCE TO RELATED APPLICATIONS

This application is a continuation-in-part of application Ser. No. 08/679,439, filed on the of Jul. 12, 1996, now abandoned.

CLAIM OF PRIORITY

This application make reference to, incorporates the same herein, and claims all benefits accruing under 35 U.S.C. §119 and 35 U.S.C. §120 from an application entitled METHOD FOR COPYING A PLURALITY OF DOCUMENTS IN FACSIMILE SYSTEM earlier filed in the Korean Industrial Property Office on Jul. 12, 1995 and assigned Ser. No. 20505/1995.

BACKGROUND OF THE INVENTION

1. Field of the Invention

The present invention relates to an image forming apparatus, and, in particular, to a technique for copying a plurality of pages on an image forming apparatus, such as a facsimile machine.

2. Description of the Related Art

Generally, a facsimile machine has a transmitting mode and a receiving mode as well as a copying mode, so that a user of the facsimile machine can copy a page. That is, once the user feeds the page for copying and then, designates the number of copies needed when the machine is in the copying mode, the facsimile machine is able to copy the fed page to produce the designated number of copies. Although a plurality of pages are fed to the facsimile system, the pages can be always copied as long as the same number of copies of each are produced.

Therefore, even if the user feeds a plurality of pages for copying requiring different numbers of copies, the facsimile machine copies those pages while producing the same number of copies of each page. For this reason, it is inconvenient to feed each page for each copying amount separately and to designate each copying amount of the fed pages individually, for the sake of copying a multiplicity of pages requiring different numbers of copies of each page. In addition, the facsimile machine has many problems in that much time can be taken in feeding and ejecting page by page upon separately copying each page and in performing additional preheating caused by the delay time for reinserting each page, as well as prolonging usage time of the facsimile machine accordingly, thereby consequently increasing power consumption.

Hube, U.S. Pat. No. 5,517,31 6, entitled Apparatus Anid Method For Saving/Storing Job Run Information Generated By Processing A Job On A Printing Machine, discloses an arrangement in a printing machine which stores the parameters for each job (consisting of a plurality of pages to be printed) rather than storing the parameters on a page by page basis.

Murakami et al., Yoda, and Mathur et al., U.S. Pat. Nos., 5,129,016, 5,185,821 and 5,499,109, respectively entitled System For Registration Of Documents, Image Filing Apparatus For Serially Storing Input Information, and System For Transferring Messages Between Input And Output Devices In A Communication Device, all disclose imaging apparatus in which information from pages are received and stored in a memory for later usage, such as being printed.

Nakayama, U.S. Pat. No. 5,084,770, entitled Image Communication Apparatus, among others, discloses a facsimile machine in which pages and data regarding these pages are stored. However, Nakayama does not teach or suggest the storage of pages and corresponding information with regard to producing copies thereof as in the present invention.

SUMMARY OF THE INVENTION

It is therefore an object of the present invention to provide a technique for copying a plurality of pages requiring different numbers of copies of each after feeding those pages in the image forming apparatus at one time.

It is another object of the present invention to provide a technique for copying a plurality of pages requiring different numbers of copies of each page, thereby reducing the time consumed upon copying those pages.

It is further another object of the present invention to provide a technique for copying a plurality of pages requiring different numbers of copies of each page, thereby reducing the power consumption needed for copying those pages.

Those and other objects can be achieved according to the present invention with an apparatus and method for copying a plurality of pages requiring different numbers of copies of each page,on an image forming apparatus, such as facsimile machine, including: (a) displaying a message after a user to designate the number of copies of each page upon feeding a plurality of pages; (b) storing the number of copies inputted by the user in response to the message for each page; and (c) scanning and storing each page, and sequentially copying the pages to produce the number of copies stored in step (b).

BRIEF DESCRIPTION OF THE DRAWINGS

A more complete appreciation of this invention, and many of the attendant advantages thereof, will be readily apparent as the same becomes better understood by reference to the following detailed description when considered in conjunction with the accompanying drawings, in which like reference symbols indicate the same or similar elements components, wherein.

DETAILED DESCRIPTION OF THE PREFERRED EMBODIMENTS

Throughout the drawings, it is noted that the same reference numerals and letters will be used to designate like or equivalent elements having the same function. Further, in the following description, numerous specific details are set forth to provide a more thorough understanding of the present invention. It will be apparent, however, to one skilled in the art that the present invention may be practiced without these specific details.

Figure 1:
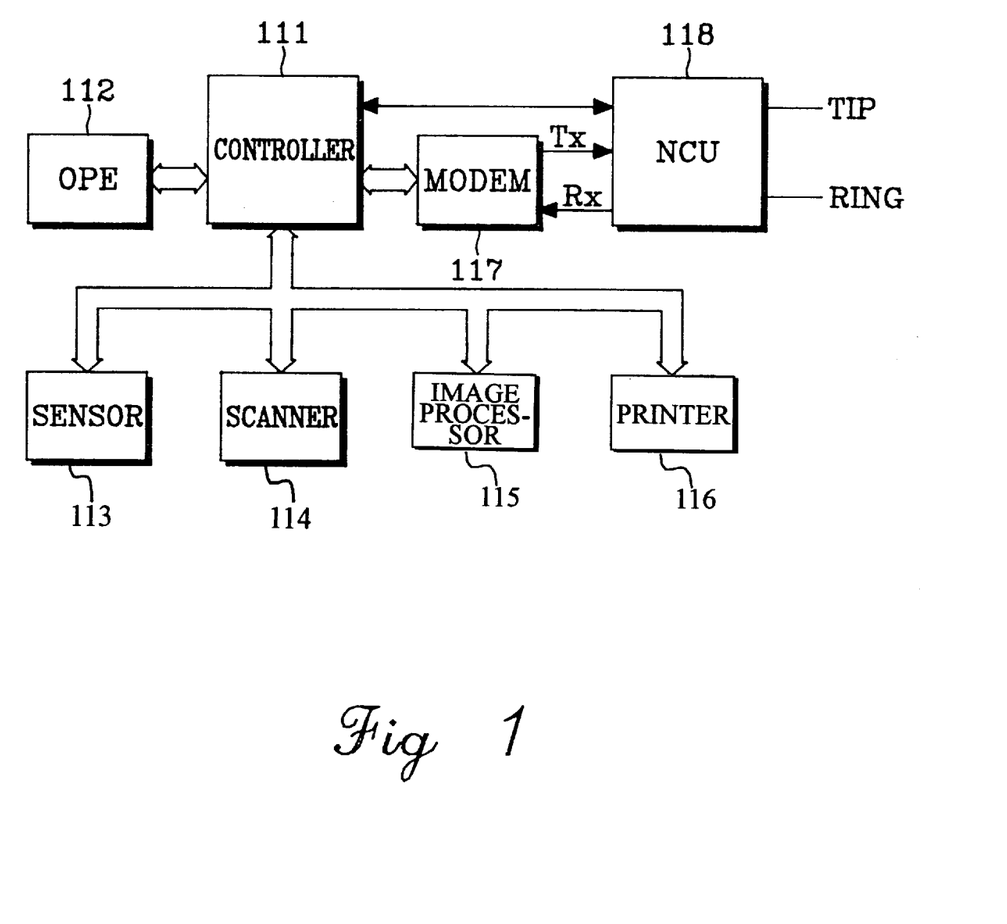
FIG. 1 is a diagram illustrating the construction of a facsimile machine to which the present invention is adapted.

FIG. 1 is a diagram illustrating the construction of a facsimile machine to which the present invention is adapted, comprising: a controller 111, an operating panel equipment (hereinafter, referred to as an OPE) 112, a sensor 113, a scanner 114, an image processor 115, a printer 116, a modem 117 and a network control unit 118 (hereinafter, referred to as an NCU).

In the facsimile machine adapting a plural page copying mode in FIG. 1, the controller 111 controls the overall operations of a transmitting mode, a receiving mode, a general copying mode, and the plural page copying mode of the facsimile machine, depending on a set program. Further, the controller 111 can include a program memory and a data memory or can be connected to an external program memory and data memory. A program according to the present invention is stored in the program memory and data generated during performance of the above program is temporarily stored in the data memory.

With regard to FIG. 1, the OPE 112 is constructed with a key input unit and a display. The key input unit of the OPE 112 generates data of a key which is pressed by the user for performing the designation of each mode and operation of the designated mode, and outputs the generated data to the controller 111. Also, as above, the display of the OPE 112 performs input and display of display data which displays the operation state of the system upon performing each mode in the controller 111. Furthermore, the sensor 113 senses the presence/absence of the input of the pages and the printing paper, i.e., whether or not a page has been inputted and whether or not there is printing paper, and outputs the sensed state signal to the controller 111.

The scanner 114 moves the inputted page, scans the image of the moved page, and converts the scanned image into digital data, and outputs the converted digital data. In the transmitting mode, the general copying mode and the plural page copying mode, the image processor 115, under the control of the controller 111, processes an image signal output by the scanner 114 and encodes the processed image signal to be in conformity with the standard size of the facsimile machine. In the receiving mode, the image processor 115 processes the encoded image signal inputted through a transmission line and decodes the processed image signal into the original image data. In the receiving mode, the general copying mode and the plural page copying mode, the printer 116, under the control of the controller 111, prints the image data inputted from the image processor 115 on the printing paper.

In the transmitting mode, the modem 117, under the control of the controller 111, modulates the image data outputted from the image processor 115 into an image signal of a transmitting format, and transmits the modulated image signal. Likewise, in the receiving mode, the modem 117 demodulates the transmitted image signal to be processed by the image processor 115. The NCU 118 connects a telephone line (tip and ring) and a transmitting/receiving path of the modem 117 under the control of the controller 111.

The facsimile machine constructed as described above performs the operation in the plural page copying mode according the present invention as shown in FIGS. 2 to 5. Referring to the construction of FIG. 1, the steps for copying a plurality of pages requiring different numbers of copies according to first to fourth embodiments of the present invention is explained below.

FIRST EMBODIMENT OF THE PRESENT INVENTION

Figure 2:
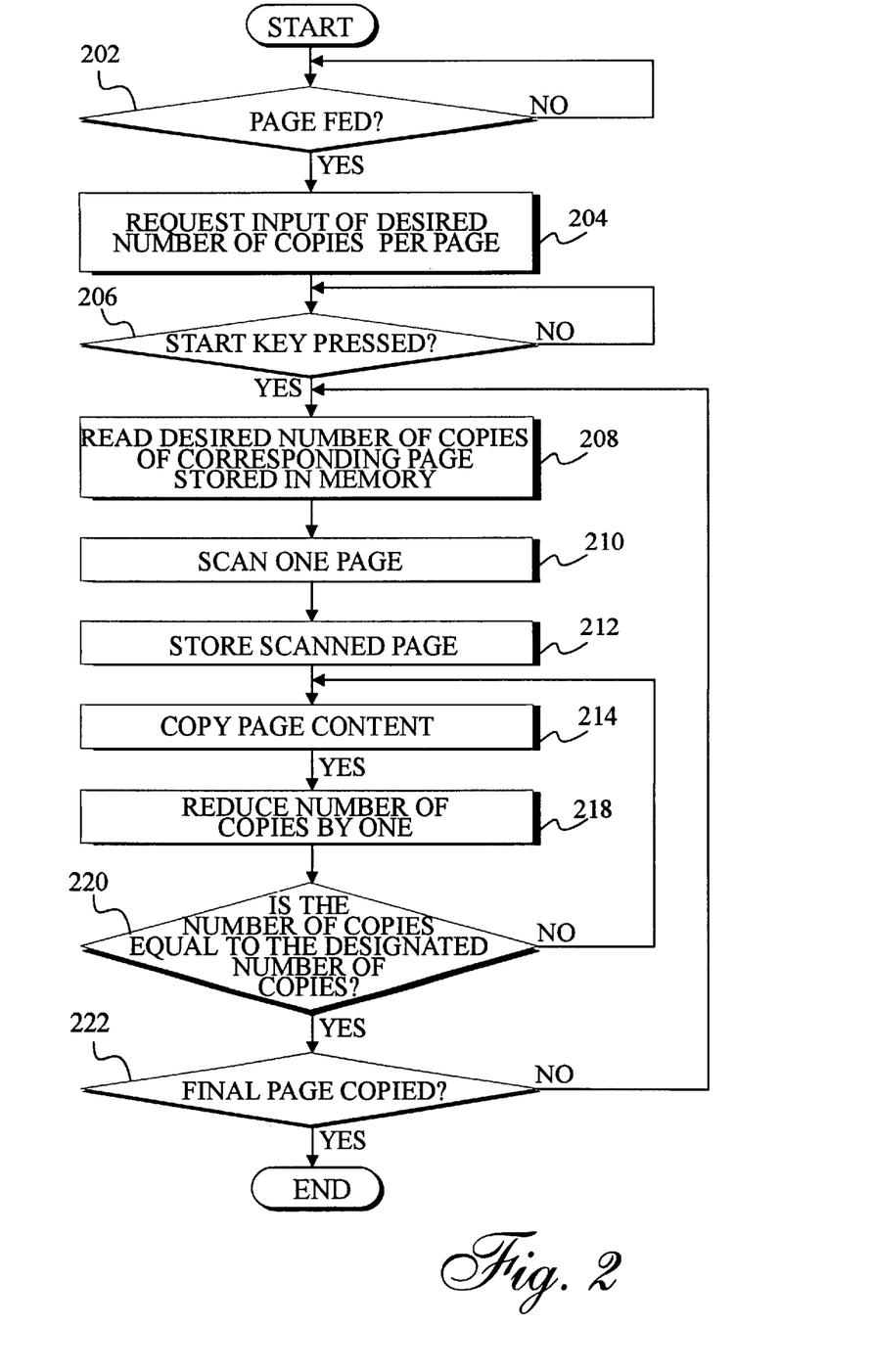
FIG. 2 is a flowchart illustrating the steps for copying a plurality of pages on a facsimile machine according to a first embodiment of the present invention.

Once a user designates the desired number of copies a page by using a plural page copying key and numeric keys which are part of the OPE 112, and then presses the start key indicative of the start of the copying, the copying operation of the page is started. The controller 111 stores each desired number of copies for each page in the memory. When a corresponding page is scanned, the controller 111 stores the content of the scanned page in the memory. Thereafter, the controller 111 performs the copying operation of the stored content thereof, providing the number of copies of the page designated by the user.

More concretely explaining the operation of the first embodiment of the present invention, when the user feeds a plurality of pages for copying, the controller 111 checks, in step 202 of FIG. 2, whether or not a page has been fed. Then, when it has been determined that a page was fed, the controller 111 proceeds to step 204 of FIG. 2. Herein, the controller 111 requests the input of the desired number of copies per page on the display of the OPE 112. In this case, in response the request, the user designates the desired number of copies of the page by using the numeric keys of the OPE 112. After that, the controller 111 checks, in step 206 of FIG. 2, whether or not the start key has been pressed. When it has determined that the start key has been pressed, the controller 111 stores the designated number of copies of the page, so that the copying operation of the page can be started.

When the copying operation is started, the controller 111, in step 208, reads the desired number of copies of a first page stored in the memory, and proceeds to step 210. The controller 111 controls the scanner 114 to scan the first page, and proceeds to step 212. The controller 111, in step 212, stores the scanned first page in the memory and, in step 214, copies the stored first page using the printer 116. When the copying operation of the first page has been completed, the controller 111 proceeds to step 218, so that the controller 111 reduces the number of copies stored in the memory by one. Then, the controller 111 proceeds to step 220, and checks whether or not the copying operation of the above page is completed, that is, has the designated number of copies of the page been made. When the number of copies has not reached the designated number of copies, the controller 111 repeats steps 214 to 220, thereby enabling the page to be copied for the designated number of copies.

When it has been determined in step 220 that the copying operation has been completed, the controller 111 checks, in step 222, whether or not a final page has been completely copied. When it has been determined that the final page has been completely copied, the controller 111 completes the copying operation of the plural pages. However, when there are pages due to be copied, i.e., when the final page has not been completely copied, the controller 111 returns to step 208. Therefore, by repeating steps 208 to 222, the controller 111 completes the copying operation of the fed plurality of pages. In most cases, since a plurality of pages are copied, the controller 111 repeatedly performs the operations steps 208 to 222 several times.

SECOND EMBODIMENT OF THE PRESENT INVENTION

Figure 3A:
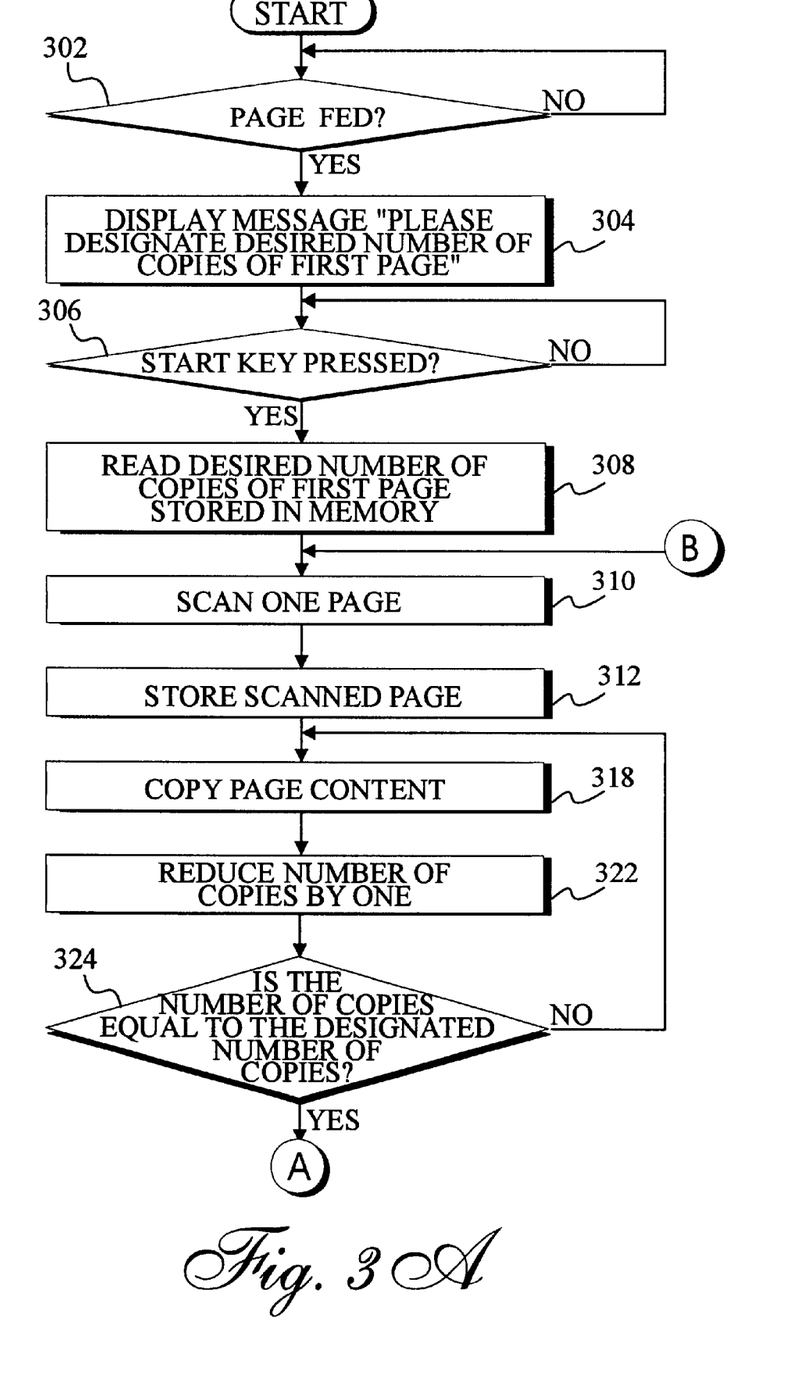
FIGS. 3A and 3B are flowcharts illustrating the steps for copying a plurality of pages on a facsimile machine according to a second embodiment of the present invention.
Figure 3B:
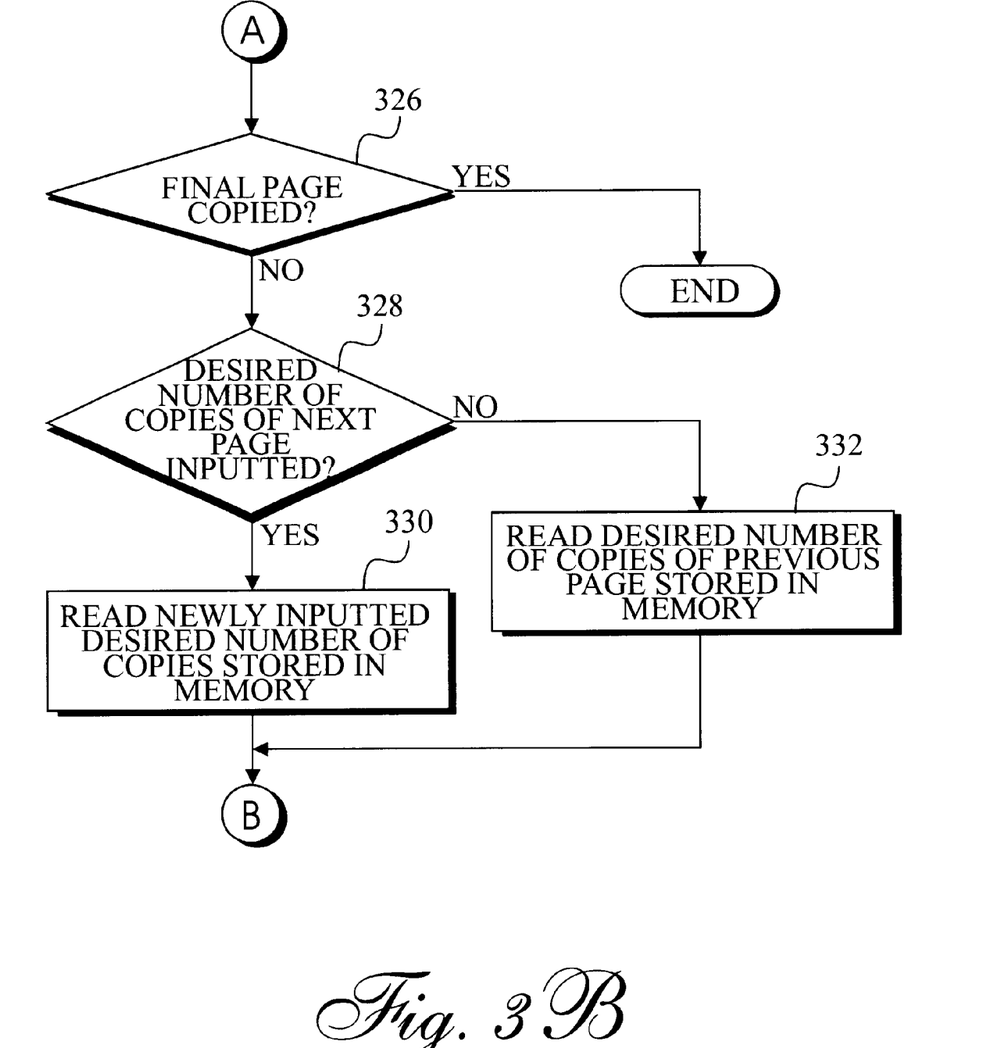

Once a user designates the desired number of copies of the page by using the plural page copying key and the numeric key which are part of the OPE 112, and then presses the start key indicative of the start of the copying, the copying operation begins. The controller 111 first stores the desired number of copies of the first page in the memory. As the first page is scanned, the controller 111 stores the content of the scanned first page in the memory. Thereafter, the controller 111 performs the copying operation of the stored content thereof, providing the number of copies previously designated by the user. At this point, while the first page is being copied, if the user inputs the desired number of copies of a next page according to a message "Please input the desired number of copies of the next page", displayed on the OPE 112, the controller 111 stores the desired number of copies of the next page. After the first page has been completely copied, the controller 111 scans the next page and stores the scanned next page in the memory, and then performs the copying operation of the stored next page, providing the number of copies previously designated by the user.

The user feeds a plurality of pages for copying, and the controller 111 checks, in step 302 of FIG. 3A, whether or not a page has been fed. Then, when it has been determined that the page was fed, the controller 111 proceeds to step 304 of FIG. 3A. Herein, the controller 111 displays a message "Please designate the number of copies of the first page." on the display of the OPE 112. After checking the message, the user designates the number of copies of the first page by using the numeric keys of the OPE 112. The controller 111 then checks, in step 306 of FIG. 3A, whether or not the start key has been pressed. When it has been determined that the start key was pressed, the controller 111 stores the designated number of copies of the first page, and then starts the copying operation of the first page.

Once the copying operation has been started, the controller 111, in step 308, reads the desired number of copies of the first page stored in the memory, and then proceeds to step 310. The controller 111 controls the scanner 114 to scan the first page. Subsequently, the controller 111, in step 312, stores the scanned first page corresponding to one page, in the memory.

In step 318, after scanning, the controller 111 copies the page stored in the memory, using the printer 116. Then, the controller 111 proceeds to step 322. The controller 111 then reduces the number of copies stored in the memory, by one. Thereafter, the controller 111 proceeds to step 324, and checks whether or not the copying operation of the above page has been completed. When the number of copies of above page has not reached the designated number of copies, the controller 111 repeats steps 318 to 324, thereby enabling the page to be copied the designated number of times.

When it has been determined, in step 324, that the copying operation thereof has been completed, the controller 111 checks, in step 326, whether or not a final page has been copied. When it has been determined that the final page has been copied, the controller 111 completes the copying operation of the plural pages. However, when it has been determined that pages due to be copied are left, i.e., when it has been determined that the final page was not copied, the controller 111 proceeds to step 328. The controller 111 then again checks whether or not the desired number of copies of the next page has been newly inputted. Thus, when it has been determined that the desired number of copies of the next page has been newly inputted, i.e., when it has been determined that pages due to be copied are left, the controller 111 proceeds to step 330. Here, the controller 111 reads the newly inputted number of copies stored in the memory. To the contrary, when it has been determined that the desired number of copies of the next page has not been newly inputted, the controller 111 reads the desired number of copies of the previous page, at step 332 and then returns to step 310. As a result, by repeating steps 310 to 332, the controller 111 completes the copying operation of the fed plurality of pages. Since a plurality of pages are usually copied, the controller 111 repeatedly performs the operations of steps 310 and 332 many times.

THIRD EMBODIMENT OF THE PRESENT INVENTION

Figure 4:
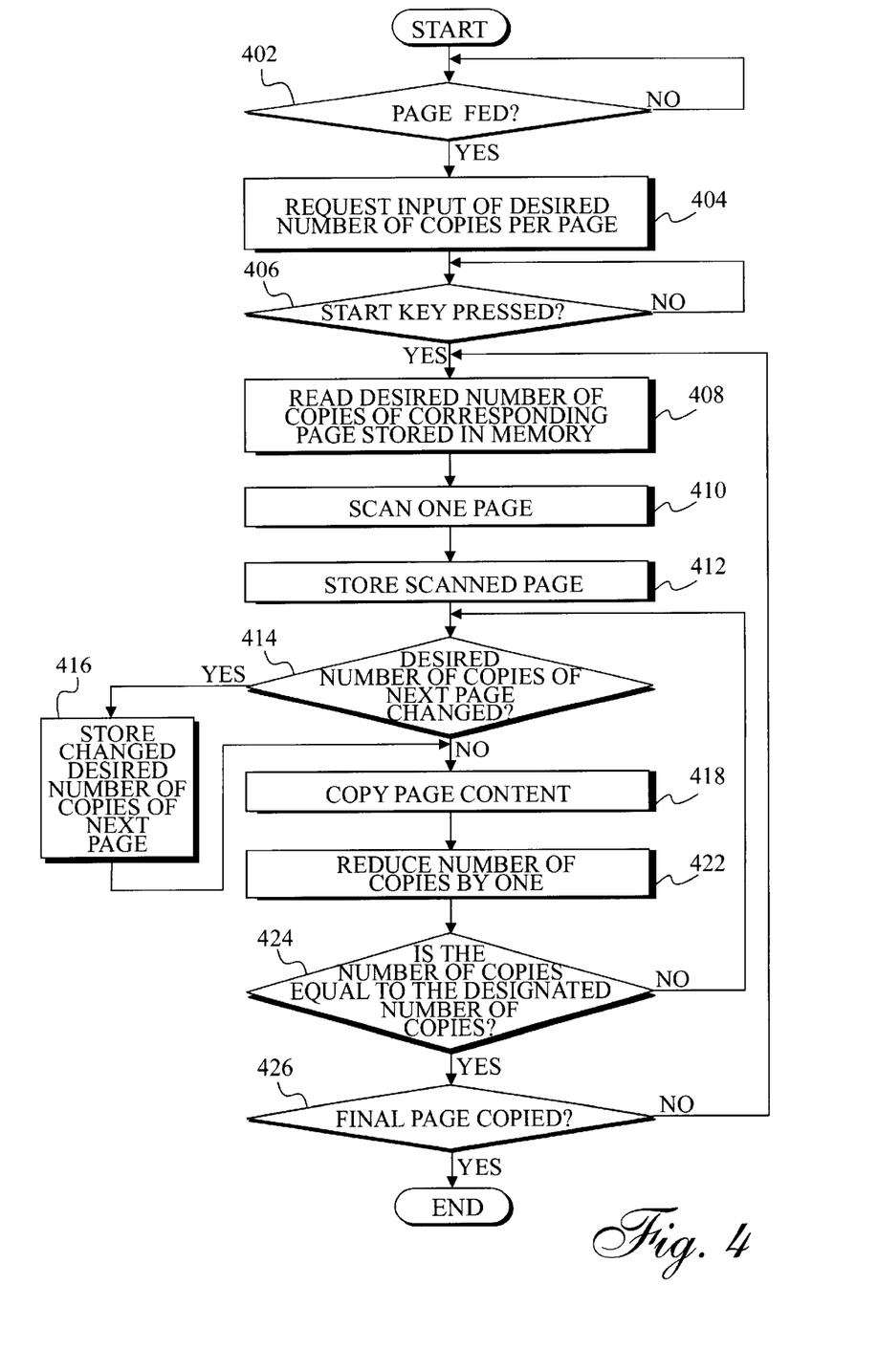
FIG. 4 is a flowchart illustrating the steps for copying a plurality of pages on a facsimile machine according to a third embodiment of the present invention.

When a user designates the desired number of copies of a page by using the plural page copying keys and the numeric keys which are part of at the OPE 112, and then presses the start key indicative of the start of the copying, the copying operation of the page is started. The controller 111 stores the desired number of copies of the page in the memory. When the corresponding page is scanned, the controller 111 stores the content of the scanned page in the memory. Thereafter, the controller 111 performs the copying operation of the stored content thereof so as to produce the number of copies designated by the user. While the copying operation for each page is performed according to the designated number of copies, if the user changes the desired number of copies of the page by the OPE 112 and inputs the changed desired number of copies, then the controller 111 copies the next page so as to produce the inputted and changed number of copies. After performing the copying operation of the above page by changing the desired number of copies of the next page, the controller 111 further copies the next page so as to produce the number of copies which was initially set by the user.

When the user feeds a plurality of pages for copying, the controller 111 checks, in step 402 of FIG. 4, whether or not a page has been fed. Then, when it has been determined that a page was fed, the controller 111 proceeds to step 404 of FIG. 4. Herein, the controller 111 then requests the input of the desired number of copies per page on the display of the OPE 112. After receiving the request, the user designates the desired number of copies of the first page by using the numeric keys of the OPE 112. The controller 111 checks, in step 406 of FIG. 4, whether or not the start key has been pressed. When it has been determined that the start keys was pressed, the controller 111 stores the designated desired number of copies of the first page, thereby starting the copying operation of the first page.

When the copying operation has been started, the controller 111, in step 408, reads the desired number of copies of the first page stored in the memory, and then proceeds to step 410. The controller 111 then controls the scanner 114 to scan the first page. The controller 111, in step 412, stores the scanned first page, in the memory. While the first page is being scanned and stored, the controller 111, in step 414, enables a message "Is the desired number of copies of the next page changed ?" to be displayed on the display of the OPE 112. If the desired number of copies of the next page is changed responsive to the above message, the controller 111 displays a message "Please designate the new desired number of copies of the next page for changing". From this, when the desired number of copies of the next page was changed by the user, the controller 111, in step 416, stores the changed desired number of copies of the next page, in the memory, and then proceeds to step 418. However, when the desired number of copies of the next page was not changed, the controller 111 directly proceeds to step 418.

After scanning, the controller 111 copies the page stored in the memory using the printer 116 at step 418 and then proceeds to step 422. The controller 111 then reduces the desired number of copies stored in the memory, by one. Thereafter, the controller 111 proceeds to step 424, and checks whether or not the copying operation of the above page has been completed, that is, has the designated number of copies been provided. In the event that the above page was not copied the designated desired number of times, the controller 111 repeats steps 414 to 424, enabling the page to be copied the designated desired number of times.

If it has been determined in step 424 that the copying operation has been completed, the controller 111 checks, in step 426, whether or not a final page has been completely copied. When it has been determined that the final page has been completely copied, the controller 111 completes the copying operation of the plurality of pages. However, when it has been determined that pages due to be copied are left, i.e., when it has been determined that the final page has not been completely copied, the controller 111 returns to step 408. By repeating steps 408 to 426, the controller 111 completes the copying operation of the fed plural pages. In most cases, since plural pages are copied, the controller 111 repeatedly performs the operations of step 408 to 426. At this point, upon copying a plurality of the pages, if the desired number of copies of the page is changed, only the desired number of copies of the corresponding page is changed and the remaining pages following the above corresponding page are copied a number of times equal to the original desired number of copies.

FOURTH EMBODIMENT OF THE PRESENT INVENTION

Figure 5:
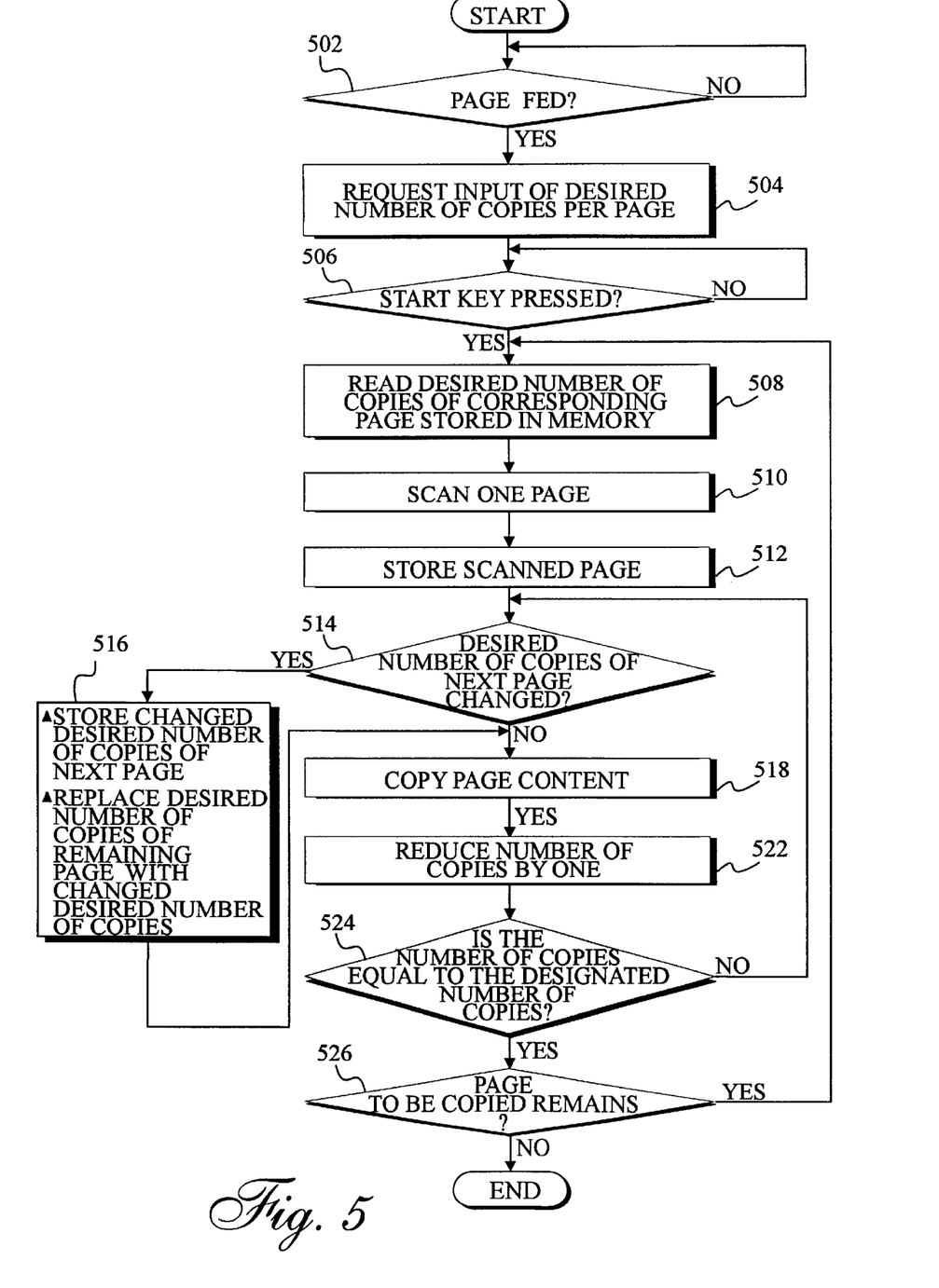
FIG. 5 is a flowchart illustrating the steps for copying a plurality of pages on a facsimile machine according to a fourth embodiment of the present invention.

Upon a user designating the desired number of copies of a page using the plural page copying keys and the numeric key which are part of the OPE 112, and pressing the start key indicative of the start of the copying, the copying operation of the page is started. The controller 111 stores the desired number of copies of the page in the memory. When the corresponding page is scanned, the controller 111 stores the content of the scanned page in the memory. Thereafter, the controller 111 performs the copying operation of the stored content to produce the number of copies designated by the user. While the copying operation by each page is performed according to the designated number of copies, if the user changes the desired number of copies of the page with the OPE 112 and inputs the changed desired number of copies, the controller 111 copies the next page to produce a number of copies equal to the inputted and changed desired number of copies. After performing the copying operation of the above page by changing the copying volume of the next page, the controller 111 further copies the next pages to produce the changed number of copies set by the user.

In particular, when the user feeds a plurality of pages for copying, the controller 111 checks, in step 502 of FIG. 5, whether or not a page has been fed. Then, when it has been determined that a page was fed, the controller 111 proceeds to step 504 of FIG. 5. The controller 111 then displays a message requesting the input of the desired number of copies per page on the display of the OPE 112. After checking the message, the user designates the desired number of copies of the first page using the numeric keys of the OPE 112. The controller 111 then checks, in step 506 of FIG. 5, whether or not the start key has been pressed. When it has determined that the start key was pressed, the controller 111 stores the designated number of copies of the first page, thereby starting the copying operation of the first page.

When the copying operation is started, the controller 111, in step 508, reads the desired number of copies of the first page that is stored in the memory, and then proceeds to step 510. The controller 111 controls the scanner 114 to scan the first page. The controller 111, in step 512, stores the scanned first page, in the memory. While the first page is scanned and stored, the controller 111, in step 514, enables a message "Is the desired number of copies Df the next page to be changed ?"to be displayed on the display of the OPE 112. If the desired number of copies of the next page is to be changed in response to the above message, the controller 111 displays a message "Please designate the new desired number of copies of the next page for changing". From this, when the desired number of copies of the next page was changed by the user, the controller 111, in step 516, stores the changed desired number of copies of the next page in the memory. Simultaneously, the controller 111 replaces the desired number of copies of all pages following the above copied page with the changed desired number of copies and stores the changed desired number of copies in the memory, and then proceeds to step 518. On the other hand, when the desired number of copies of the next page was not changed, the controller 111 directly proceeds to step 518.

In step 518, after scanning, the controller 111 copies the pace stored in the memory using the printer 116, and then proceeds to step 522. The controller 111 then reduces the number of copies stored in the memory, by one. Thereafter, the controller 111 proceeds to step 524, and checks whether or not the copying operation of the above page has been completed. In the event that the above page was not copied the designated number of times, the controller 111 repeats steps 514 to 524, thereby eventually enabling the page to be copied the designated number of times.

When it has been determined, in step 524, that the copying operation thereof has been completed, the controller 111 checks, in step 526, whether or not a page remains to be copied. Here, when checked that no page remains to be copied, the controller 111 completes the copying operation ofthe plurality of pages. However, when it has been determined that pages due to be copied are left, i.e., when it has been determined that the final page has not been copied, the controller 111 returns to step 508. By repeating steps 508 to 526, the controller 111 completes the copying operation of t0 the fed plurality of pages. In most cases, since a plurality of pages are copied, the controller 111 repeatedly performs the operations of steps 508 to 526. At this point, upon copying a plurality of the pages, if the desired number of copies of the page is changed, both the desired number of copies of the corresponding page and the remaining pages following the above corresponding page are changed.

As apparent from the foregoing, to the present invention can achieve copying a plurality of pages requiring different numbers of copies has a facsimile machine which performs the operation of the plural page copying mode, so that, although a plurality of pages are fed in one time, those pages can be copied different numbers of times. Consequently, upon copying a plurality of pages different numbers of times, it is advantages in that the time required for copying a multiplicity of pages can be reduced and the power consumption can be reduced positively.

While there have been illustrated and described what are considered to be preferred embodiments of the present invention, it will be understood by those skilled in the art that various changes and modifications may be made, and equivalents may be substituted for elements thereof without departing from the true scope of the present invention. In addition, many modifications may be made to adapt a particular situation to the teaching of the present invention without departing from the central scope thereof. Therefore, it is intended that the present invention not be limited to the particular embodiments disclosed as the best modes contemplated for carrying out the present invention, but that the present invention includes all embodiments falling within the scope of the appended claims.

What is claimed is:

1. A method of copying a plurality of pages requiring different numbers of copies in a copying mode of a facsimile machine, comprising the steps of:

displaying a first message asking a user to designate a desired copy number for a first page upon feeding a plurality of pages to the facsimile machine;

storing the desired copy number for the first page input by the user in response to the first message displayed;

scanning and storing the fed first page, and copying the first page to produce the first page in number equal to the stored desired copy number for the first page;

displaying a second message asking the user to designate a desired copy number for a next page while copying the first page;

storing the desired copy number for the next page input by the user in response to the second message displayed;

when the first page has been completely copied, scanning and storing the next page fed after the first page, and copying the next page to produce the next page in number equal to the desired copy number for the next page stored; and repeatedly displaying said second message asking the user to designate a desired copy number for any succeeding page following the next page while copying a page previous to any succeeding page, storing a corresponding desired copy number for any succeeding page input by the user in response to said second message displayed, and, when a page previous to any succeeding page has been completely copied, scanning and storing any succeeding page fed after the previous page, and copying any succeeding page to produce any succeeding page in number equal to a corresponding desired copy number stored.

2. A method of copying a plurality of pages requiring different numbers of copies in a copying mode of a facsimile machine, comprising the steps of:

displaying a first message asking a user to designate a corresponding desired copy number for each page independent of a desired copy number for any other page upon feeding a plurality of pages to the facsimile machine;

storing each desired copy number input by the user in response to the first message for each page;

scanning and storing the fed pages, and sequentially copying the pages to produce each page in number equal to a desired copy number corresponding to each page;

displaying a second message asking the user to designate a desired changed copy number while copying the pages fed, to produce a corresponding page in number equal to a desired changed copy number for the corresponding page; and scanning, storing and subsequently copying the corresponding page, according to a desired changed copy number when input by the user in response to the second message displayed.

3. A method of copying a plurality of pages requiring different numbers of copies in a copying mode of a facsimile machine, comprising the steps of:

displaying a first message asking a user to designate a corresponding desired copy number for each page independent of a desired copy number for any other page upon feeding a plurality of pages to the facsimile machine;

storing a corresponding desired copy number input by the user in response to the first message for each page;

scanning and storing the fed pages, and sequentially copying the pages to produce each page in number equal to a desired copy number corresponding to each page;

displaying a second message asking the user to designate a desired changed copy number while copying the fed pages to produce a corresponding page in number equal to a desired changed copy number: and scanning, storing and subsequently copying the pages fed according to a corresponding desired changed copy number when input by the user in response to the second message displayed.

4. An apparatus for copying a plurality of pages requiring different numbers of copies in a copying mode of a facsimile machine, comprising:

a display for displaying a message asking a user to designate a desired copy number for a first page upon feeding a plurality of pages to the facsimile machine;

a memory for storing the desired copy number for the first page input to an input means by the user in response to the message displayed by said display asking the user to designate the desired copy number for the first page;

a scanner for scanning the fed first page and said memory for storing the scanned first page, and a printer for copying the first page to produce the first page in number equal to the stored desired copy number for the first page;

said display for displaying a message asking the user to designate a desired copy number for a next succeeding page while copying a previous page;

said memory for storing the desired copy number for the next succeeding page, the desired copy number for the next succeeding page being input to said input means by the user in response to the message displayed by said display asking the user to designate the desired copy number for the next succeeding page; and when the previous page has been completely copied, said scanner for scanning and said memory for storing the next succeeding page fed after the previous page, and said printer for copying the next succeeding page to produce the next succeeding page in number equal to the desired copy number for the next succeeding page now stored in said memory, until the plurality of pages have been each copied in number equal to a corresponding designated desired copy number.

5. An apparatus for copying a plurality of pages requiring different numbers of copies in a copying mode of a facsimile machine, comprising:

a display for displaying a first message asking a user to designate a corresponding desired copy number for each page independent of a desired copy number for any other page upon feeding a plurality of pages to the facsimile machine;

a memory for storing each desired copy number input to an input means by the user in response to the first message for each page;

a scanner for scanning the fed pages and said memory for storing the scanned fed pages, and a printer for sequentially copying the pages to produce each page in number equal to a corresponding desired copy number for each page stored in said memory;

said display for displaying a second message asking a user to designate a desired changed copy number while copying the fed pages scanned by said scanner, to produce a corresponding page in number equal to a corresponding desired changed copy number; and said scanner for scannings said memory for storing and said printer for subsequently copying a next page, according to a corresponding desired changed copy number when input to said input means by the user in response to the second message asking a user to designate a desired changed copy number for the next page.

6. An apparatus for copying a plurality of pages requiring different numbers of copies in a copying mode of a facsimile machine, comprising:

a display for displaying a first message asking a user to designate a corresponding desired copy number for each page independent of a desired copy number for any other page upon feeding a plurality of pages to the facsimile machine;

a memory for storing each desired copy number input to an input means by the user in response to the first message for each page;

a scanner for scanning the fed pages and said memory for storing the scanned fed pages, and a printer for sequentially copying the pages to produce each page in number equal to a corresponding desired copy number for each page input to said input means;

said display for displaying a second message asking the user to designate a desired changed copy number while copying the fed pages to produce a corresponding page in number equal to a corresponding desired changed copy number; and said scanner for scanning, said memory for storing and said printer for subsequently copying a corresponding page fed according to a corresponding desired changed copy number when input to said input means by the user in response to the second message asking a user to designate a desired changed copy number.

7. A method of copying a plurality of pages requiring different numbers of copies in an image forming apparatus, comprising the steps of:

displaying a first message asking a user to designate a desired copy number for a first page upon feeding a plurality of pages to the image forming apparatus;

storing the desired copy number for the first page input by the user in response to the first message displayed;

scanning and storing the fed first page, and copying the first page to produce the first page in number equal to the stored desired copy number for the first page;

displaying a second message asking the user to designate a desired copy number for a next page while copying the first page;

storing the desired copy number for the next page input by the user in response to the second message displayed;

when the first page has been completely copied, scanning and storing the next page fed after the first page, and copying the next page to produce the next page in number equal to the desired copy number for the next page stored; and repeatedly displaying said second message asking the user to designate a desired copy number for any succeeding page following the next page while copying a page previous to any succeeding page, storing a corresponding desired copy number for any succeeding page input by the user in response to said second message displayed, and, when a page previous to any succeeding page has been completely copied, scanning and storing any succeeding page fed after the previous page, and copying any succeeding page to produce any succeeding page in number equal to a corresponding desired copy number stored.

8. A method of copying a plurality of pages requiring different numbers of copies in an image forming apparatus, comprising the steps of:

displaying a first message asking a user to designate a corresponding desired copy number for each page independent of a desired copy number for any other page upon feeding a plurality of pages to the image forming apparatus;

storing each desired copy number input by the user in response to the first message for each page;

scanning and storing the fed pages, and sequentially copying the pages to produce each page in number equal to a desired copy number corresponding to each page;

displaying a second message asking the user to designate a desired changed copy number while copying the pages fed, to produce a corresponding page in number equal to a desired changed copy number for the corresponding page; and scanning, storing and subsequently copying the corresponding page, according to a desired changed copy number when input by the user in response to the second message displayed.

9. A method of copying a plurality of pages requiring different numbers of copies in an image forming apparatus, comprising the steps of:

displaying a first message asking a user to designate a corresponding desired copy number for each page independent of a desired copy number for any other page upon feeding a plurality of pages to the image forming apparatus;

storing a corresponding desired copy number input by the user in response to the first message for each page;

scanning and storing the fed pages, and sequentially copying the pages to produce each page in number equal to a desired copy number corresponding to each page;

displaying a second message asking a user to designate a desired changed copy number while copying the fed pages to produce a corresponding page in number equal to a desired changed copy number; and scanning, storing and subsequently copying the pages fed according to a corresponding desired changed copy number when input by the user in response to the second message displayed.

10. An image forming apparatus for copying a plurality of pages requiring different numbers of copies, comprising:

a display for displaying a message asking a user to designate a desired copy number for a first page upon feeding a plurality of pages to the image forming apparatus;

a memory for storing the desired copy number for the first page input to an input means by the user in response to the message displayed by said display asking the user to designate the desired copy number for the first page;

a scanner for scanning the fed first page and said memory for storing the scanned first page, and a printer for copying the first page to produce the first page in number equal to the stored desired copy number for the first page;

said display for displaying a message asking the user to designate a desired copy number for a next succeeding page while copying a previous page;

said memory for storing the desired copy number for the next succeeding page, the desired copy number for the next succeeding page being input to said input means by the user in response to the message displayed by said display asking the user to designate the desired copy number for the next succeeding page; and when the previous page has been completely copied, said scanner for scanning and said memory for storing the next succeeding page fed after the previous page, and said printer for copying the next succeeding page to produce the next succeeding page in number equal to the desired copy number for the next succeeding page now stored in said memory, until the plurality of pages have been each copied in number equal to a corresponding designated desired copy number.

11. An image forming apparatus for copying a plurality of pages requiring different numbers of copies, comprising:

a display for displaying a first message asking a user to designate a corresponding desired copy number for each page independent of a desired copy number for any other page upon feeding a plurality of pages to the image forming apparatus;

a memory for storing each desired copy number input to an input means by the user in response to the first message for each page;

a scanner for scanning the fed pages and said memory for storing the scanned fed pages, and a printer for sequentially copying the pages to produce each page in number equal to a corresponding desired copy number for each page stored in said memory;

said display for displaying a second message asking a user to designate a desired changed copy number while copying the fed pages scanned by said scanner, to produce a corresponding page in number equal to a corresponding desired changed copy number; and said scanner for scanning, said memory for storing and said printer for subsequently copying a next page, according to a corresponding desired charged copy number when input to said input means by the user in response to the second message asking a user to designate a desired changed copy number for the next page.

12. An image forming apparatus for copying a plurality of pages requiring different numbers of copies, comprising:

a display for displaying a first message asking a user to designate a corresponding desired copy number for each page independent of a desired copy number for any other page upon feeding a plurality of pages to the image forming apparatus;

a memory for storing each desired copy number input to an input means by the user in response to the first message for each page;

a scanner for scanning the fed pages and said memory for storing the scanned fed pages, and a printer for sequentially copying the pages to produce each page in number equal to a corresponding desired copy number for each page input to said input means;

said display for displaying a second message asking the user to designate a desired changed copy number while copying the fed pages to produce a corresponding page in number equal to a corresponding desired changed copy number; and said scanner for scanning, said memory for storing and said printer for subsequently copying a corresponding page fed according to a corresponding desired changed copy number when input to said input means by the user in response to the second message asking a user to designate a desired changed copy number.

\* \* \* \* \*